(12) United States Patent
Aldrich et al.

(10) Patent No.: US 8,692,139 B2
(45) Date of Patent: Apr. 8, 2014

(54) CABLE GLAND ASSEMBLY FOR TERMINATING CABLE

(75) Inventors: Alvah Aldrich, Geneva, NY (US); Evgeny M. Orlov, Syracuse, NY (US)

(73) Assignee: Cooper Technologies Company, Houston, TX (US)

(*) Notice: Subject to any disclaimer, the term of this patent is extended or adjusted under 35 U.S.C. 154(b) by 72 days.

(21) Appl. No.: 13/605,569

(22) Filed: Sep. 6, 2012

(65) Prior Publication Data

US 2013/0056264 A1    Mar. 7, 2013

Related U.S. Application Data

(60) Provisional application No. 61/531,169, filed on Sep. 6, 2011, provisional application No. 61/639,409, filed on Apr. 27, 2012.

(51) Int. Cl.
*H01B 17/58* (2006.01)

(52) U.S. Cl.
USPC ............ 174/653; 174/650; 174/652; 439/271

(58) Field of Classification Search
USPC .......... 174/652, 653, 650, 665; 439/271, 278, 439/279; 285/151.1
See application file for complete search history.

(56) References Cited

U.S. PATENT DOCUMENTS

| | | | | |
|---|---|---|---|---|
| 4,515,991 A | * | 5/1985 | Hutchison | 174/654 |
| 5,321,205 A | * | 6/1994 | Bawa et al. | 174/655 |
| 5,929,383 A | * | 7/1999 | Marik et al. | 174/78 |
| 7,976,070 B2 | * | 7/2011 | Kiely | 285/151.1 |

* cited by examiner

*Primary Examiner* — Dhirubhai R Patel
(74) *Attorney, Agent, or Firm* — King & Spalding LLP (57) ABSTRACT

A cable gland assembly for terminating cable is described herein. The cable gland assembly can include a gland configured to receive a cable, and a gland nut disposed around the gland. A skid washer may be disposed within the gland nut above or below the gland. The cable gland assembly can also include an intermediate body having a first end and a second end, in which the first end may be coupled to the gland nut. The cable gland assembly can further include a body coupled to the second end of the intermediate body, and an intermediate nut disposed around a portion of the body and the second end of the intermediate body.

24 Claims, 6 Drawing Sheets

CABLE GLAND ASSEMBLY FOR TERMINATING CABLE

CROSS-REFERENCE TO RELATED APPLICATIONS

This application claims priority under 35 U.S.C. §119 to U.S. Provisional Patent Application Ser. No. 61/531,169, titled "Cable Gland Assembly for Terminating Cable" and filed on Sep. 6, 2011; and U.S. Provisional Patent Application Ser. No. 61/639,409, titled "Cable Gland Assembly for Terminating Cable" and filed on Apr. 27, 2012. The entire contents of each of the foregoing applications are hereby incorporated herein by reference.

TECHNICAL FIELD

The present disclosure relates generally to cable gland connectors, and more particularly to systems, methods, and devices for cable gland assemblies for terminating cable.

BACKGROUND

Cable gland assemblies are used for terminating cable in hazardous and nonhazardous environments. Specifically, cable gland assemblies generally provides a means for terminating cables, such as armored cables, at junctions boxes, control centers, panel boards, enclosures, and the like. Typical cable gland assemblies provide a seal around the conductors of the cable, mechanical retention of the cable therein, electrical continuity via the termination of the cable, and aim to protect the cable. Additionally, typical cable gland assemblies may be assembled from several components. At various times, the cable assembly may need to be disassembled and/or reassembled. During disassembly, the numerous components of a conventional cable gland may come apart, including those that do not need to separate for purposes of the disassembly. This makes disassembly and reassembly of the cable gland assembly more complex, time consuming, and error-prone. Additionally, environmental debris may enter the cable gland from mating points of certain components as conventional cable gland assemblies may not provide a robust enough seal between certain components. This may lead to degradation of the cable and/or conductor, and reduce the quality of the cable gland.

SUMMARY

In general, in one aspect, the disclosure relates to a cable gland assembly for terminating cable. The cable gland assembly may include a gland nut having an exterior wall and an interior wall. The interior wall of the cable gland assembly may define a gland nut opening. The cable gland assembly may also include a gland positioned within the gland nut opening. The gland may define a gland opening for receiving a cable therein. The cable gland assembly can further include a first skid washer disposed above the gland within the gland nut. The first skid washer is generally configured to be retained by the gland nut and retain the gland. The cable gland assembly further includes an intermediate body. The intermediate body may include a first intermediate body end and a second intermediate body end. The first intermediate body end may be coupled to the gland nut. The intermediate body may also have a first sealing feature proximate the second intermediate body end. The cable gland assembly can include a body coupled to the intermediate body at the second intermediate body end, and an intermediate body nut coupled to the intermediate body and the body at the second intermediate body end. The intermediate body nut may have a second sealing feature corresponding to the first sealing feature of the intermediate body, in which the first and second sealing features can join to provide a seal. The cable gland assembly can also include a compound chamber positioned within an interior of the body, in which the compound chamber has an opening for receiving a sealing compound and at least one conductor of said cable therein.

In another aspect, the disclosure can generally relate to a gland assembly for a cable gland. The gland assembly may include a gland nut, a top skid washer, and a gland. The gland nut may include a washer retaining feature for semi-permanently coupling to the top skid washer. The top skid washer may include a gland retaining feature for semi-permanently coupling to the gland and a nut retaining feature for semi-permanently coupling to the gland nut. The gland includes a washer retaining feature for semi-permanently coupling to the top skid washer.

In yet another aspect, the disclosure can generally relate to a cable gland assembly for terminating cable. The cable gland assembly may include a gland nut having an exterior wall and an interior wall. The interior wall of the gland nut may define a gland nut opening. The cable gland assembly may include a gland positioned within the gland nut opening, in which the gland defines a gland opening for receiving a cable therein. The cable gland assembly can also include an intermediate body having a first intermediate body end and a second intermediate body end. The first intermediate body end may be coupled to the gland nut, and the intermediate body may have a first sealing feature proximate the second intermediate body end. The cable gland assembly may further include a body coupled to the intermediate body at the second intermediate body end, and an intermediate body nut coupled to the intermediate body and the body at the second intermediate body end. The intermediate body nut may have a second sealing feature corresponding to the first sealing feature of the intermediate body, in which the first and second sealing features join to provide a seal.

These and other aspects, objects, features, and embodiments will be apparent from the following description and the appended claims.

BRIEF DESCRIPTION OF THE DRAWINGS

The drawings illustrate only exemplary embodiments and are therefore not to be considered limiting in scope, as the exemplary embodiments may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION

In general, exemplary embodiments provide systems, methods, and devices for a cable gland assembly. The cable gland assembly described herein is easier to assemble and/or disassemble and provides robust sealing of the cable gland against environmental debris. Specifically, the cable gland assembly may be disassembled while allowing certain components inside the cable gland to remain intact with respect to each other, decreasing the number of loose parts.

Figure 6:
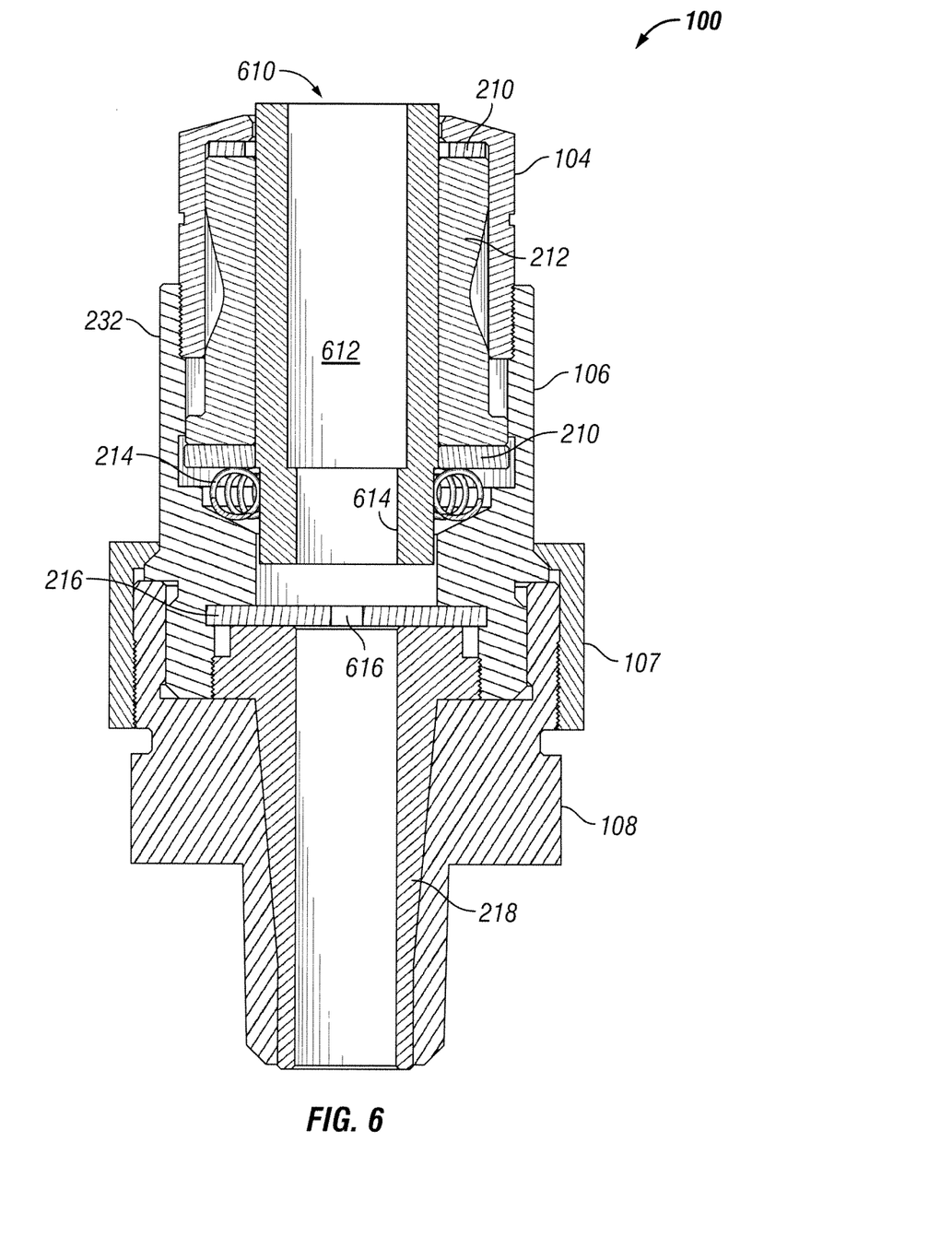
FIG. 6 is a cross-sectional view of another embodiment of a cable gland assembly, in accordance with exemplary embodiments of this disclosure.

Many components of the cable gland assembly may be referred to as having generally cylindrically, circular, or conical features, and as having cylindrical or circular holes, cavities, and openings. Such features may be referred to or defined by a circumference, radius, external surface, internal surface, and/or other terms appropriate for defining such features. It should be noted that such features may alternatively be elliptical, polygonal, and the like in certain embodiments. In such embodiments, the features may be defined in corresponding terms appropriate for that shape (e.g., perimeter, edge, area, surface). FIGS. 2 and 6 show cross-sectional views of two exemplary cable gland assemblies 100 according to certain exemplary embodiments. In one or more embodiments, one or more of the components or elements shown in FIGS. 2 and 6 may be omitted, repeated, and/or substituted. Accordingly, embodiments of the cable gland assembly should not be considered limited to the specific configurations shown in FIGS. 1 and 6.

Figure 1:
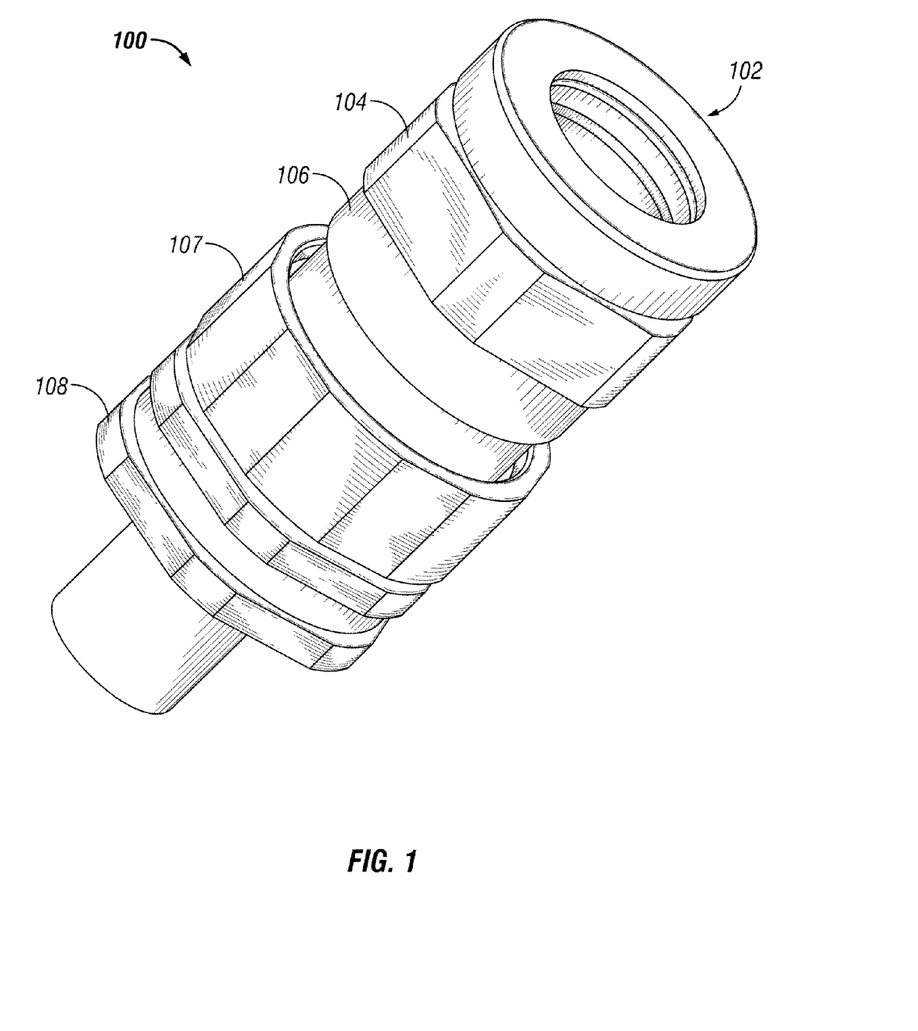
FIG. 1 is a perspective view of a first embodiment of a cable gland assembly, in accordance with exemplary embodiments of this disclosure.
Figure 2:
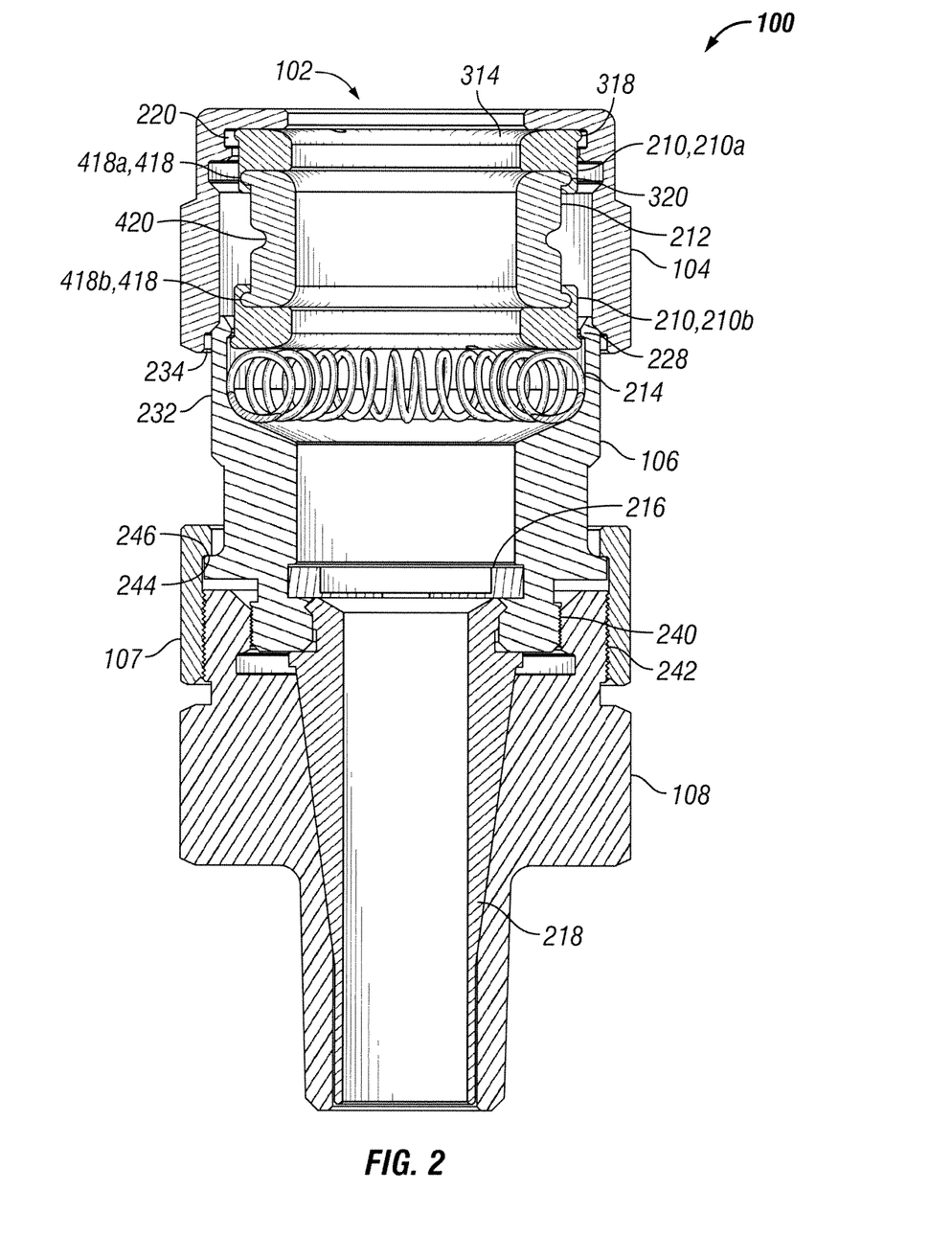
FIG. 2 is a cross-sectional view of a first embodiment of a cable gland assembly, in accordance with exemplary embodiments of this disclosure.

Referring now to FIG. 1, one embodiment of the cable gland assembly 100, as seen externally, includes a gland nut 104, an intermediate body 106, a body 108, and an intermediate body nut 107 disposed around portions of the intermediate body 106 and body 108. Each of the gland nut 104, intermediate body 106, and body 108 include a central opening and are coupled together concentrically such that a cable path 102 traverses the cable gland 100. A cable (not pictured) may be disposed and/or terminated inside the cable path 102. In certain embodiments, the cable may be retained by tightening the gland nut 104 about the intermediate body.

FIG. 2 illustrates a cross-sectional view of a first embodiment of the cable gland assembly 100 of FIG. 1. In addition to the gland nut 104, intermediate body 106, and body 108, the cable gland assembly 100 may also include one or more skid washers 210, a gland 212, a grounding spring 214, an armor stop 216 (also known as a damming device), and a compound chamber 218. Likewise, each of the skid washers 210, the gland 212, the grounding spring 214, the armor stop 216, and the compound chamber 218 have a central opening and are concentrically disposed about each other in the manner illustrated such that the cable path 102 traverses the cable gland 100.

In certain embodiments, the gland nut 104 may be disposed around a top portion 232 of the intermediate body 106. The gland nut 104 may be disposed around the top portion 232 of the intermediate body 106 at various amounts. For example, FIG. 2 illustrates the gland nut 104 in a loosened state, in which a relatively small amount of the top portion 232 of the intermediate body 106 is disposed within the gland nut 104. As the gland nut 104 is tightened and/or pushed downward onto to the intermediate body 106, the top portion 232 of the intermediate body 106 becomes increasingly disposed within the gland nut 104. In a tightened state (not shown), the gland nut 104 may be more fully disposed around the intermediate body 106. As such, the gland nut 104 and the top portion 232 of the intermediate body 106 may include a first and second mating feature 234.

In certain embodiments, the first and second mating feature 234 may allow a semi-permanent and/or various levels of mating between the gland nut 104 and the top portion 232 of the intermediate body 106. For example, the first and second mating feature 234 may be threads that allow the gland nut 104 to be twisted further onto the top portion 232 of the intermediate body 106. In some embodiments, the first and second mating feature 234 may include sliders, tabs, clamps, snaps, and other suitable mating features.

In certain embodiments, the gland 212 is generally disposed within the gland nut 104, and the one or more skid washers 210 are disposed generally above and/or below the gland 212. Specifically, in certain embodiments, a top skid washer 210a may be disposed above the gland 212, between the gland nut 104 and the gland 212, and a bottom skid washer 210b may be disposed below the gland 212, mirroring the top skid washer 210a. In the illustrated embodiment, the gland nut 104 includes a washer retainer 220 on an inner surface of the gland nut 104. The washer retainer 220 may include a groove or ledge encircling the inner surface of the gland nut near the top where the top skid washer 210a is disposed for retaining the top skid washer 210a. Likewise, the top portion 232 of the intermediate body 106 may also include a washer stopper 228 for stopping the bottom skid washer 210b from traveling past the washer stopper 228 during regular use. The washer stopper 228 of the intermediate body 106 may include a ledge, hook, or other appropriate inward protrusion.

Figure 3:
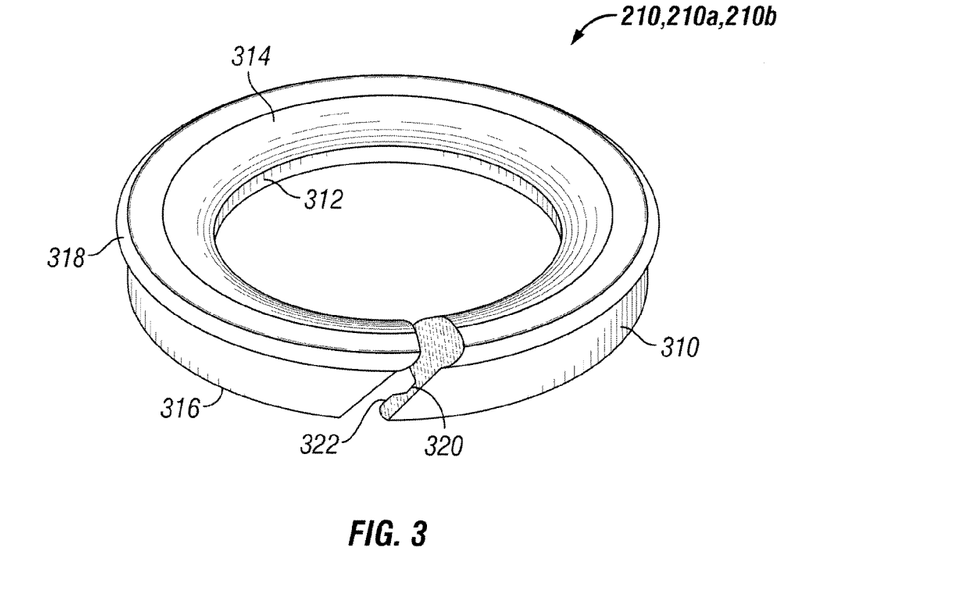
FIG. 3 is a perspective view of a first embodiment of a skid washer, in accordance with exemplary embodiments of this disclosure.

The skid washer 210 is illustrated individually in FIG. 3. The skid washer 210 is generally circularly-shaped, and defined between an outer surface 310 and an inner surface 312, and between a top surface 314 and a bottom surface 316. The top surface 314 of the skid washer 210 may be curved. In certain embodiments, the top surface 314 may be straight. In this embodiment, the skid washer 210 includes a top ledge 318 extending outward from and encircling the outer surface 310 adjacent to the top surface 314. When the top skid washer 210a is disposed in the gland nut 104, the top ledge 318 may be forcefully disposed past, and thus engaged with the washer retainer 220 of in the gland nut 104. Thus, the top skid washer 210a may remain generally coupled to the gland nut 104 unless purposefully and/or forcefully taken apart. The skid washer 210 further includes a gland retainer 320 for retaining a portion of the gland 212 therein. The gland retainer 320 may include a groove, ledge, or other appropriate retaining feature encircling the inner surface 312 of the skid washer 210 near the bottom surface 316. The gland retainer 320 further includes a receiving edge 322 through which the gland 212 is to be disposed. In certain embodiments, the skid washer may be made of nylon.

Figure 4:
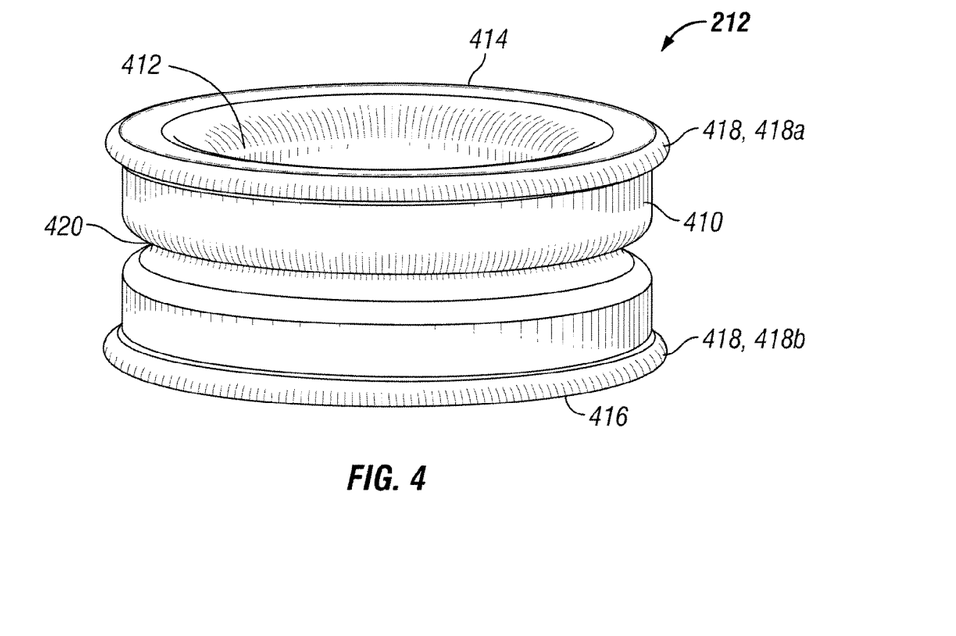
FIG. 4 is a perspective view of a gland, in accordance with exemplary embodiments of this disclosure.

FIG. 4 is a perspective view of the gland 212, in accordance with aspects of exemplary embodiments of this disclosure. The gland 212 may be defined between an outer surface 410 and an inner surface 412, and between a top surface 414 and a bottom surface 416. The inner surface 412 further defines the central opening in the gland 212 where the cable is disposed. In certain embodiments, the gland 212 also includes one or more ridges 418 extending from and encircling the outer surface 410 of the gland 212 adjacent to the top surface 414 and/or bottom surface 416. Specifically, in the illustrated embodiment, the gland 212 includes a top ridge 418a adjacent to the top surface 414 and a bottom ridge 418b adjacent to the bottom surface 416.

In certain embodiments, the gland 212 and the top skid washer 210a are configured to couple to each other via the gland retainer 320 in the top skid washer 210a and the top ridge 418a of the gland 212. Specifically, the largest circumference of the top ridge 418a is generally larger than the receiving edge 322 of the gland retainer 320 in a neutral position and generally similar to the largest circumference of the gland retainer 320. As such, the top ridge 418a of the gland 212 is configured to be forced past the receiving edge 322 and snapped into the gland retainer 320. Thus, the top ridge 418a is generally retained by the top skid washer 210a unless pulled apart by a sufficient force, the sufficient force generally being greater than the force of gravity. Likewise, in certain embodiments, the bottom ridge 418b of the gland 212 is similarly disposed in and retained by a similar gland retainer of the bottom skid washer 210b. Thus, in such embodiments, the gland 212 generally remains coupled to the bottom skid washer 210b unless pulled apart by a sufficient force, the sufficient force generally being greater than the force of gravity.

The gland 212 may also include a bevel in and encircling the outer surface 410 of the gland 212. Generally, the bevel is located around the middle of the gland, approximately halfway between the top surface 414 and the bottom surface 416. Generally, when the gland nut 104 is in the loosened position shown in FIG. 2, the gland is in a neutral position, as shown. Thus, the gland 212 and skid washers 210 generally fill up the space between the gland nut 104 and the intermediate body 106. As the gland nut 104 is tightened or forced further onto the intermediate body 106, the gland 212 becomes increasingly vertically compressed. As the bevel 420 provides a thinner portion of the gland, the compression may be focused at the bevel 420. Thus, the bevel 420 provides a consistent and predictable point of compression for the gland 212. In alternate embodiments, the bevel may have contours different than those shown in FIG. 4 and may be positioned at different locations along the gland than that shown in FIG. 4. The gland may be made of an elastomer material, such as, but not limited to, neoprene.

Referring again to FIG. 2, the gland nut 104 may semi-permanently couple to the top skid washer 210a via the retaining feature provided by the washer retainer 220 and the top ledge 318 of the top skid washer 210a. It should be noted that semi-permanently coupled to generally refers to two object that are generally inseparable without a sufficient amount separation force, in which the separation force is generally greater than the force of gravity. For example, when elements are described herein as semi-permanently coupled, the elements remain together when the gland nut 104 is removed from the gland and the elements generally will not separate until a separation force greater than gravity is applied to pull the elements apart.

Accordingly, the gland 212 is semi-permanently coupled to the top skid washer 210a via the gland retainer 320 in the top skid washer 210a and the top ridge 418a of the gland 212. Likewise, the gland 212 is also semi-permanently coupled the bottom skid washer 210b via the bottom ridge 418b of the gland 212 and the gland retainer 320 of the bottom skid washer 210b. Furthermore, the bottom skid washer 210b may also be semi-permanently coupled to the intermediate body 106 via the top ledge 318 of the bottom skid washer 210b and the washer stopper 228 of the intermediate body 106, as discussed above. Consequently, the gland nut 104, the skid washers 210, and the gland 212, the intermediate body 106, or a subset thereof, may remained intact with respect to each other when the cable gland assembly 100 is disassembled.

As mentioned, a cable (not shown) is to be disposed in the cable path 102 of the cable gland assembly 100. The cable may include an outer layer, an armor layer, and a at least one conductor. Generally, when the cable is fully disposed in the cable gland assembly, the cable is configured such that the outer layer passes through the gland nut 104 and the gland 212, but stops before the grounding spring 214. Thus, the armor layer is exposed and disposed through the grounding spring 214, but stops at the armor stop 216. Generally, when the gland nut 104 is tightened and the gland 212 is compressed, the bottom skid washer 210b or the gland 212 compresses the grounding spring towards the cable, in which the armor layer is exposed. Thus, compression of the grounding spring 214 ensures that the grounding spring 214 establishes conductive contact with the armor layer, providing a grounding path for the armor layer. Additionally, compression of the grounding spring 214 towards the armor layer provides an inward radial compression of the grounding spring 214 around the armor layer. Thus, the cable and armor layer may be further retained in the grounding spring 214 and the cable gland assembly 100. As the armor layer stops at the armor stop 216, only the conductor or conductors of the cable pass through the armor stop 216 and into the compound chamber 218. The compound chamber 218 is generally disposed within the body 108. The compound chamber may be filled with a sealing compound surrounding the conductor(s). Thus, a substantially air tight bond may be formed between the conductor(s) and the compound chamber 218. Additionally, the compound chamber 218 provides a flame path along the exterior of the compound chamber 218 between the compound chamber 218 and the body 108. In certain embodiments, the compound chamber 190 may encompass the armor stop 216.

In the illustrated embodiment of FIG. 2, the intermediate body 106 further includes a bottom portion 240 mated to a top portion 242 of the body 108. The mating portions of the bottom portion 240 of the intermediate body 106 and the top portion 242 of the body may include an anti-rotation feature such as a gripping surface such that the intermediate body 106 and the body 108 do not rotate with respect to each other when coupled. The bottom portion 240 of the intermediate body 106 includes a first sealing feature 244. The intermediate body nut 107 is generally disposed around the bottom portion 240 of the intermediate body 106 and the top portion 242 of the body 108. Thus, the coupling regions of the intermediate body 106 with the body 108 are disposed within the intermediate body nut 106. The intermediate body nut 106 may include a second sealing feature 246 such that when the intermediate body nut 106 is fully disposed around the bottom portion 240 of the intermediate body 106 and the top portion 242 of the body 106, the first sealing feature 244 and the second sealing feature 246 join to create a seal around an entire edge of the intermediate body nut 107. The first sealing feature 244 may include a lip having a curved surface disposed on and encircling the bottom portion 240 of the intermediate body 106. The second sealing feature 246 may include an incline plane encircling the entire edge of the intermediate body nut 107. When the first and second sealing features 244, 246 join, the curved surface of the first sealing feature 244 and the incline plane of the second sealing feature 246 create robust contact around the cable gland assembly 100, preventing environmental debris, water, and the like from penetrating the cable gland 100. In certain embodiments, the first sealing feature 244 may include an incline plane and the second sealing feature 246 may include a curved surface, or the first and second sealing features 244, 246 may both include curved surfaces or both include corresponding incline planes. In the exemplary embodiment, the sealing features 244 and 246 are made of metallic material and form a metal-on-metal seal.

Figure 5A:
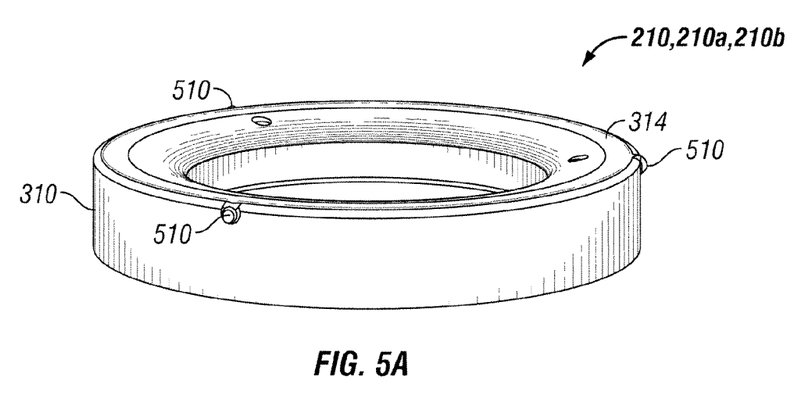
FIGS. 5a-5b are perspective views of a second embodiment of a skid washer, in accordance with exemplary embodiments of this disclosure.
Figure 5B:
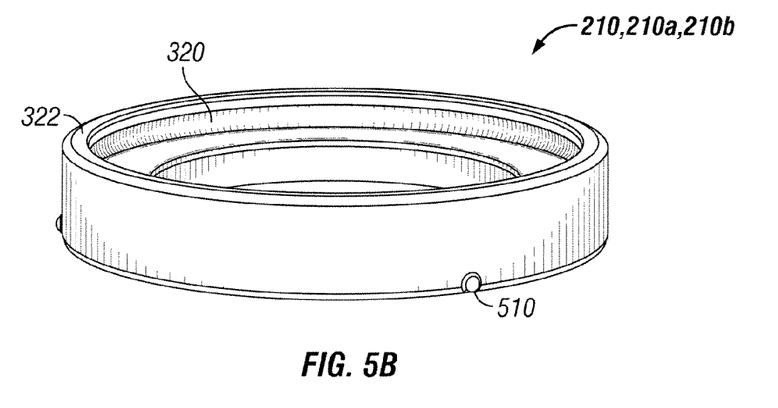

FIGS. 5a and 5b illustrate another embodiment of the skid washer 210. FIG. 5a illustrates a top perspective view of the skid washer 210, and FIG. 5b illustrates a bottom perspective view. In this embodiments, the skid washer includes a plurality of nodes 510 disposed on the outer surface 310 adjacent to the upper surface 314. These nodes 510 generally have the same function as the top ledge 318 in the embodiment illustrated in FIG. 3. Accordingly, the nodes 510 may be disposed in and retained by the washer retainer 220 of the gland nut 104. In some embodiments, the washer retainer 220 may include a plurality of node cavities rather than a groove for retaining the nodes 510 of the skid washer 210. In some embodiments, the skid washer 210 may include various other features such as tabs, clips, hooks, receptacles, magnets, for semi-permanently coupling to the gland nut 104. Accordingly, the gland nut 104 may includes various other features for retaining the skid washer 210. It should be noted that the top skid washer 210a and the bottom skid washer 210b may be identical in certain embodiments and non-identical in some embodiments.

FIG. 6 is a cross-sectional view of another embodiment of the cable gland assembly 100. In this embodiment, the gland nut 104 is disposed inside the top portion 232 of the intermediate body 106. Furthermore, FIG. 6 shows the cable gland assembly 100 having a cable 610 disposed therein. As previously discussed, the cable 610 includes an outer layer 612, an armor layer 614, and at least one conductor 616. The outer layer 612 of the cable 610 is disposed up to the grounding spring 214, leaving the armor layer 614 exposed such that the grounding spring 214 is able to make contact with the armor layer 614. The armor layer is disposed up to the armor stop 216, and the conductor 616 is disposed through to the compound chamber 218.

Figure 7:
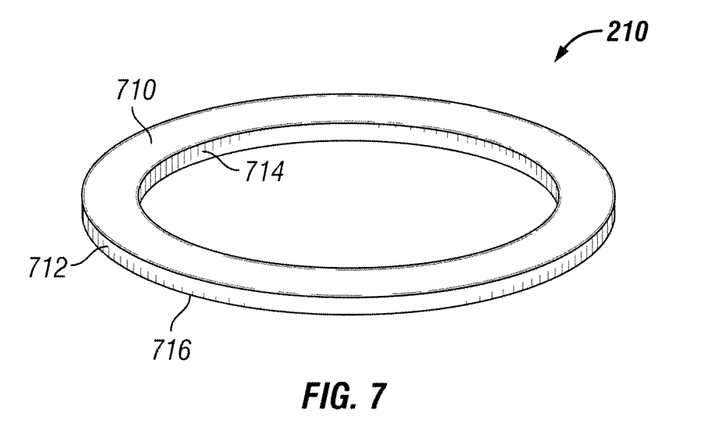
FIG. 7 is a perspective view of a third embodiment of a skid washer, in accordance with exemplary embodiments of this disclosure.

The skid washer 210 of this embodiment is illustrated in FIG. 7. In this embodiment, the skid washer 210 may be defined by a top surface 710, a bottom surface 716, an outer surface 712, and an inner surface 714. The skid washer 210 may also be disposed above and/or below the gland 212 within the gland nut 104. The skid washer 210 allows the gland nut to rotate freely with respect to the gland 212. It should be noted that the exemplary embodiments of the skid washer 210 discussed in this disclosure are not exhaustive, and the cable gland 100 may include any combination of embodiments of the skid washer 210.

The cable gland assembly 100 may be configured differently than exemplified in the above embodiments. For example, the described grooves, lips, threads, anti-rotation features, etc., may be replaced with other appropriate mating features that allow the respective components to be appropriately coupled, such as, but not limited to threadably, removably, clampably, slidably coupled, or a combination thereof. Generally, the gland nut 104, gland 212, skid washer 210, intermediate body 106, grounding spring 214, armor stop 216, body 108, compound chamber 218, and intermediate body nut 107 may be made of materials such as, but not limited to, metal, plastic, rubber, ceramic, nylon, or a combination thereof.

Although the embodiments herein are described with reference to preferred and/or exemplary embodiments, it should be appreciated by those skilled in the art that various modifications are well within the scope and spirit of this disclosure.

From the foregoing, it will be appreciated that embodiments herein overcome the limitations of the prior art. Those skilled in the art will appreciate that the exemplary embodiments are not limited to any specifically discussed application and that the embodiments described herein are illustrative and not restrictive. From the description of the exemplary embodiments, equivalents of the elements shown therein will suggest themselves to those skilled in the art, and ways of constructing other embodiments will suggest themselves to practitioners of the art. Therefore, the scope of the exemplary embodiments is not limited herein.

What is claimed is:

1. A gland assembly for a cable gland, comprising:
   a gland nut;
   a top skid washer; and
   a gland,
   wherein the gland nut comprises:
      a first washer retaining feature for semi-permanently coupling to the top skid washer;
   wherein the top skid washer comprises:
      a first gland retaining feature for semi-permanently coupling to the gland; and
      a top surface comprising at least one protruding feature for semi-permanently coupling to the gland nut,
   wherein the gland comprises:
      a top ridge for semi-permanently coupling to the first gland retaining feature of the top skid washer.

2. The gland assembly of claim 1, further comprising:
   a bottom skid washer, wherein the bottom skid washer comprises a second gland retaining feature for semi-permanently coupling to the gland.

3. The gland assembly of claim 2, further comprising:
   an intermediate body comprising a top end, the top end having a second washer retaining feature for semi-permanently coupling to the bottom skid washer.

4. The gland assembly of claim 3, wherein the intermediate body further comprises a bottom end, the bottom end coupled to a body, the body having a compound chamber disposed therein.

5. The gland assembly of claim 3, further comprising:
   a spring disposed within the intermediate body, the spring configured to ground, retain, or ground and retain a cable disposed therein.

6. A cable gland assembly for terminating cable, comprising:
   a gland nut having an exterior wall and an interior wall, the interior wall defining a gland nut opening;
   a gland positioned within the gland nut opening, the gland defining a gland opening for receiving a cable therein;
   an intermediate body having a top end and a bottom end, the top end coupled to the gland nut, the intermediate body having a first sealing feature proximate the bottom end;
   a body coupled to the bottom end of the intermediate body; and
   an intermediate body nut coupled to the body and the bottom end of the intermediate body, the intermediate body nut having a second sealing feature corresponding to the first sealing feature of the intermediate body, wherein the first and second sealing features join to provide a seal.

7. The cable gland assembly of claim 6, wherein the first sealing feature includes an angled portion and the second sealing feature includes a curved portion.

8. The cable gland assembly of claim 6, wherein the second sealing feature includes an angled portion and the first sealing feature includes a curved portion.

9. The cable gland assembly of claim 6, wherein the first sealing feature and the second sealing feature both include a curved portion.

10. The cable gland assembly of claim 6, wherein the first sealing feature and the second sealing feature both include an angled portion.

11. The cable gland assembly of claim 6, further comprising:
   a spring disposed within the intermediate body, the spring configured to ground, retain, or ground and retain a cable disposed therein, wherein the spring is electrically coupled to a metal layer of said cable.

12. The cable gland assembly of claim 11, wherein the spring retains the cable therein via radial compression of the spring around the cable.

13. The cable gland assembly of claim 6, further comprising:
   a first skid washer disposed above the gland within the gland nut opening, the first skid washer configured to be retained by the gland nut and retain the gland within the gland nut opening.

14. The cable gland assembly of claim 13, wherein at least one selected from a group consisting of the gland nut and the intermediate body comprises a washer retainer for semi-permanently coupling to the first skid washer.

15. The cable gland assembly of claim 13, wherein the first skid washer comprises a gland retaining feature for semi-permanently coupling to the gland.

16. The cable gland assembly of claim 13, further comprising:
   a second skid washer disposed below the gland opposite the first skid washer, the second skid washer configured to retain the gland.

17. The cable gland assembly of claim 16, wherein the second skid washer is retained by the top end of the intermediate body.

18. The cable gland assembly of claim 6, wherein at least one of the intermediate body or the top portion of the body comprises an anti-rotation feature for preventing or reducing rotation of the intermediate body with respect to the body.

19. The cable gland assembly of claim 6, wherein a portion of the gland nut is disposed within the top end of the intermediate body.

20. The cable gland assembly of claim 6, wherein a portion of the top end of the intermediate body is disposed within the gland nut.

21. The cable gland assembly of claim 6, further comprising:
   a compound chamber positioned within an interior of the body, the compound chamber having an opening for receiving a sealing compound and at least one conductor of said cable therein.

22. The cable gland assembly of claim 6, wherein the gland comprises a bevel disposed thereon, wherein the bevel provides a point of compression for the gland when the gland nut applies a compressive force on the gland.

23. The cable gland assembly of claim 22, wherein the bevel allows the gland to provide a seal against the cable.

24. The cable gland assembly of claim 6, wherein the gland, the intermediate body, the body, and the intermediate body nut remain semi-permanently coupled to each other when the gland nut is removed.

\* \* \* \* \*